United States Patent
Huang et al.

(10) Patent No.: US 8,320,470 B2
(45) Date of Patent: Nov. 27, 2012

(54) METHOD FOR SPATIAL ERROR CONCEALMENT

(75) Inventors: Shih-Chia Huang, Taipei (TW); Sy-Yen Kuo, Taipei (TW)

(73) Assignee: Acer Incorporated, Hsichih, Taipei Hsien (TW)

( * ) Notice: Subject to any disclaimer, the term of this patent is extended or adjusted under 35 U.S.C. 154(b) by 288 days.

(21) Appl. No.: 12/613,233

(22) Filed: Nov. 5, 2009

(65) Prior Publication Data

US 2010/0322309 A1 Dec. 23, 2010

(30) Foreign Application Priority Data

Jun. 23, 2009 (TW) ................................ 98121004 A (51) Int. Cl.
*H04N 7/34* (2006.01)
(52) U.S. Cl. .............................. 375/240.27; 375/240.24
(58) Field of Classification Search ............. 375/240.24, 375/240.27
See application file for complete search history.

(56) References Cited

U.S. PATENT DOCUMENTS

| | | | | | |
|---|---|---|---|---|---|
| 5,724,369 | A | * | 3/1998 | Brailean et al. | 714/747 |
| 5,936,674 | A | * | 8/1999 | Kim | 375/240.24 |
| 6,329,819 | B1 | * | 12/2001 | Manduca et al. | 324/309 |
| 2003/0206667 | A1 | * | 11/2003 | Wang et al. | 382/300 |
| 2006/0146940 | A1 | * | 7/2006 | Gomila et al. | 375/240.27 |
| 2006/0269153 | A1 | * | 11/2006 | Shi et al. | 382/236 |
| 2010/0054331 | A1 | * | 3/2010 | Haddad et al. | 375/240.12 |

FOREIGN PATENT DOCUMENTS

| | | |
|---|---|---|
| WO | WO2004064397 A1 | 7/2004 |
| WO | WO2006122314 A3 | 11/2006 |

OTHER PUBLICATIONS

Meisinger, K., et al., "Spatial Error Concealment of Corrupted Image Data Using Frequency Selective Extrapolation," ICASSP 2004, vol. III, p. 209-212.
Salama, P., et al., "Error Concealment in Encoded Video Streams," Video and Image Processing Laboratory (VIPER), School of Electrical and Computer Engineering, Purdue University, Undated (36 pages).
Wang, YK, et al., "The Error Concealment Feature in the H.26L Test Model," IEEE ICIP 2002, vol. II, p. 729-732.
Wang, Yao, et al., "Maximally Smooth Image Recovery in Transform Coding," IEEE Transactions on Communications, vol. 41, No. 10, Oct. 1993, p. 1544-1551.
Zhu, QF, et al., "Coding and Cell-Loss Recovery in DCT-Based Packet Video," IEEE Transactions on Circuits and Systems for Video Technology, vol. 3, No. 3, Jun. 1993, p. 248-258.
Hemami, S., et al., "Transform Coded Image Reconstruction Exploiting Interblock Correlation," IEEE Transactions on Image Processing, vol. 4, No. 7, Jul. 1995, p. 1023-1027.
Park, JW, et al., "DCT Coefficients Recovery-Based Error Concealment Technique and Its Application to the MPEG-2 Bit Stream Error," IEEE Transactions on Circuits and Systems for Video Technology, vol. 7, No. 6, Dec. 1997, p. 845-854.

(Continued)

*Primary Examiner* — Sath V Perungavoor
*Assistant Examiner* — Jeffery Williams
(74) *Attorney, Agent, or Firm* — Snell & Wilmer L.L.P.

(57) ABSTRACT

A method for performing spatial error concealment is provided. The method includes the following steps: detecting a damaged macroblock; obtaining coding information of neighboring macroblocks of the damaged macroblock; determining edge feature of the damaged macroblock based on the coding information; and according to the edge feature, selecting a bilinear interpolation algorithm or a directional interpolation algorithm to conceal errors within the damaged macroblock.

3 Claims, 9 Drawing Sheets

OTHER PUBLICATIONS

Alkachouh, Z., et al., "Fast DCT-Based Spatial Domain Interpolation of Blocks in Images," IEEE Transactions on Image Processing, vol. 9, No. 4, Apr. 2000, p. 729-732.

Rongfu, Z., et al., "Content-Adaptive Spatial Error Concealment for Video Communication," IEEE Transactions on Consumer Electronics, vol. 50, No. 1, Feb. 2004, p. 335-341.

Agrafiotis, D., et al., "Enhanced Error Concealment with Mode Selection," IEEE Transactions on Circuits and Systems for Video Technology, vol. 16, No. 8, Aug. 2006, p. 960-973.

Huang, S.C., et al., "Optimization of Spatial Error Concealment for H.264 Featuring Low Complexity," MMM 2008, LNCS 4903, p. 391-401, 2008.

* cited by examiner

Mode 1

Mode 3

Mode 0

Mode 2

METHOD FOR SPATIAL ERROR CONCEALMENT

CROSS-REFERENCE TO RELATED APPLICATIONS

This application claims priority to Taiwan Patent Application No. 098121004 entitled "METHOD FOR SPATIAL ERROR CONCEALMENT," filed on Jun. 23, 2009, which is incorporated herein by reference.

FIELD OF INVENTION

The present invention relates to a method for spatial error concealment, and more particularly to a spatial error concealment method capable of reducing computation complexity for edge direction detection by referring to the encoding information.

BACKGROUND OF THE INVENTION

Since multimedia applications are becoming more and more popular, the video compression techniques are also becoming increasingly important. The main principle of these compression techniques is to eliminate redundancy among successive frames to reduce the storage requirement and the amount of transmission data. Intra prediction and inter prediction are two new coding techniques developed by H.264/AVC compression standard. The intra prediction technique utilizes the spatial correlation among neighboring blocks within one frame, while the inter prediction technique utilizes the temporal correlation among consecutive frames.

Figure 1A:
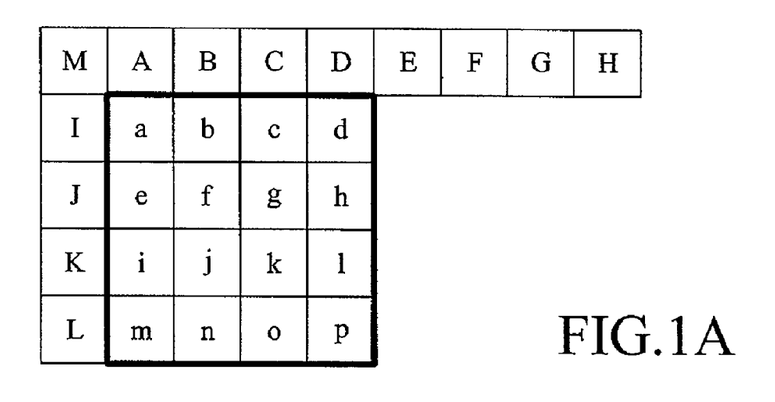
FIGS. 1A-1C are diagrams illustrating the prediction modes of intra prediction coding.
Figure 1B:
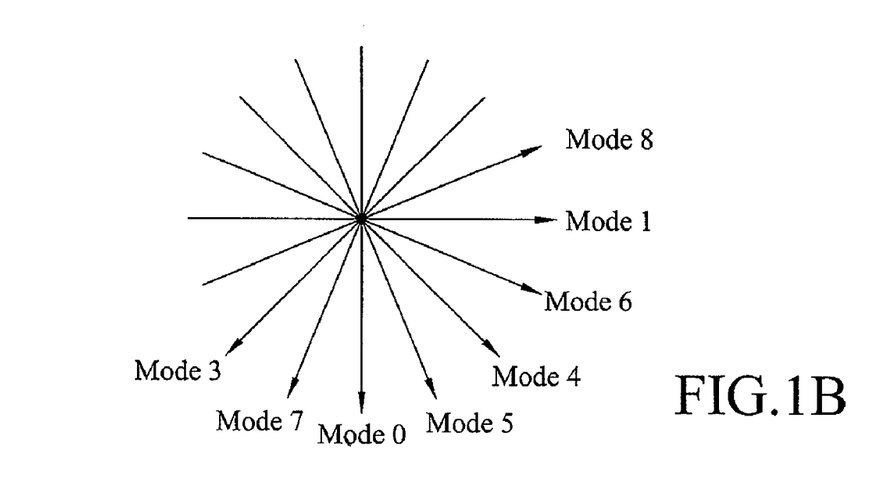
Figure 1C:
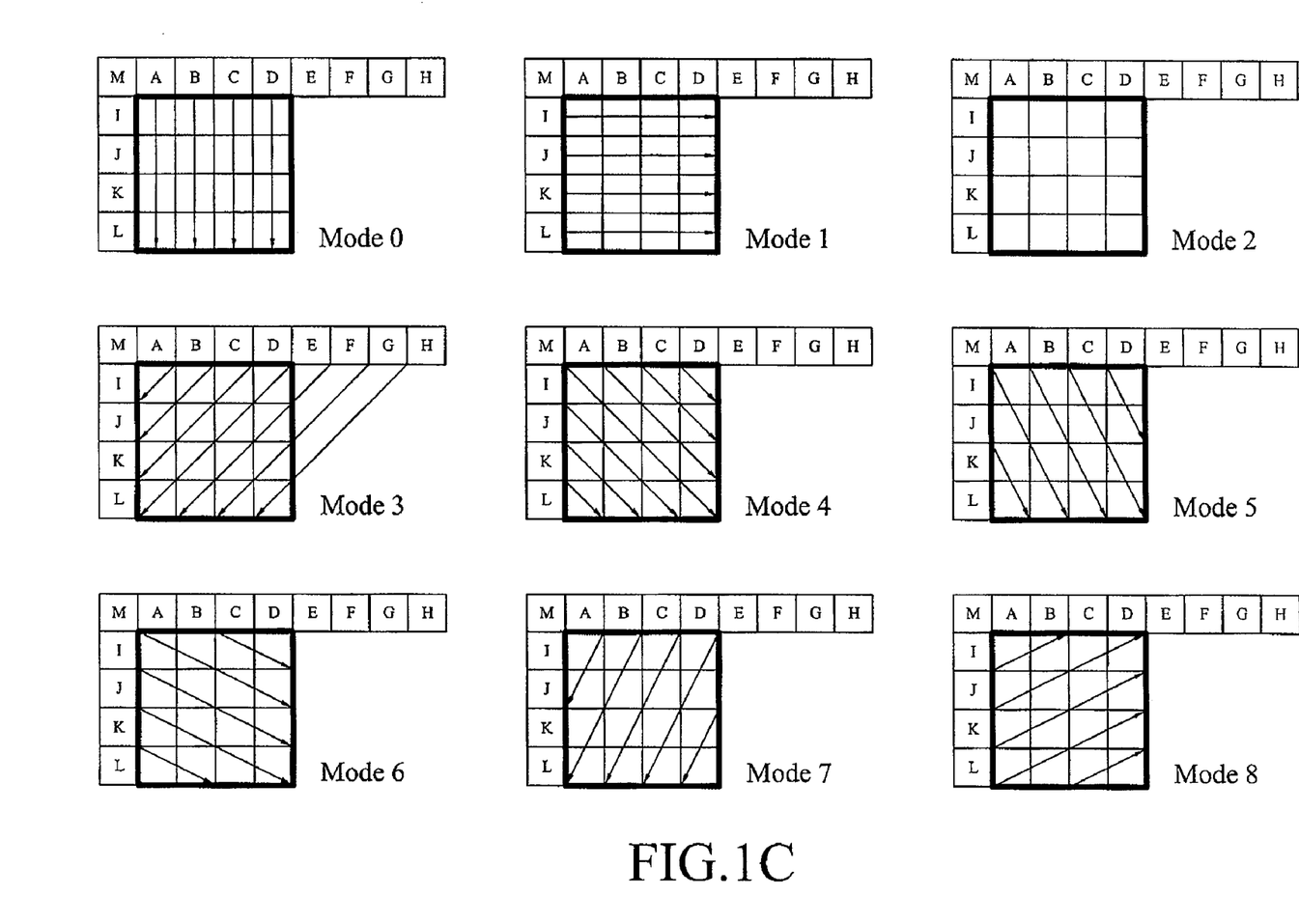

Referring to intra prediction, the H.264/AVC compression standard defines both of intra 4×4 and intra 16×16 luma prediction modes. There are nine optional prediction modes for each 4×4 luma block and four optional prediction modes for each 16×16 luma block. Referring to FIG. 1A, the region indicated by the bold line is a 4×4 block to be predicted, which is consisted of pixels a-p, neighboring with coded pixels A-Z. FIGS. 1B and 1C depict the directions and implements of the nine 4×4 prediction modes respectively, which use the pixel values of the border pixels A-M to replace the values of the pixels a-p. Modes 0-8 contain one vertical prediction mode, one horizontal prediction mode, one DC prediction mode, and six diagonal prediction modes. In the DC prediction mode (mode 2), each of the pixels a-p is replaced by an average of pixel values of the border pixels A-M. Further, for the remaining prediction modes, the manners for replacing the pixels are illustrated by the arrows shown in FIG. 1C. More information regarding the nine prediction modes can be found in Draft ITU-T Recommendation and Final Draft International Standard of Joint Video Specification (ITU-T Rec. H.264|ISO/IEC 14496-10 ACV), p. 100~102. After performing the nine prediction modes, error between the predicted pixel value and the original pixel value of the 4×4 block is calculated for each prediction mode. Then, the mode with minimum error will be adopted for coding.

Figure 2:
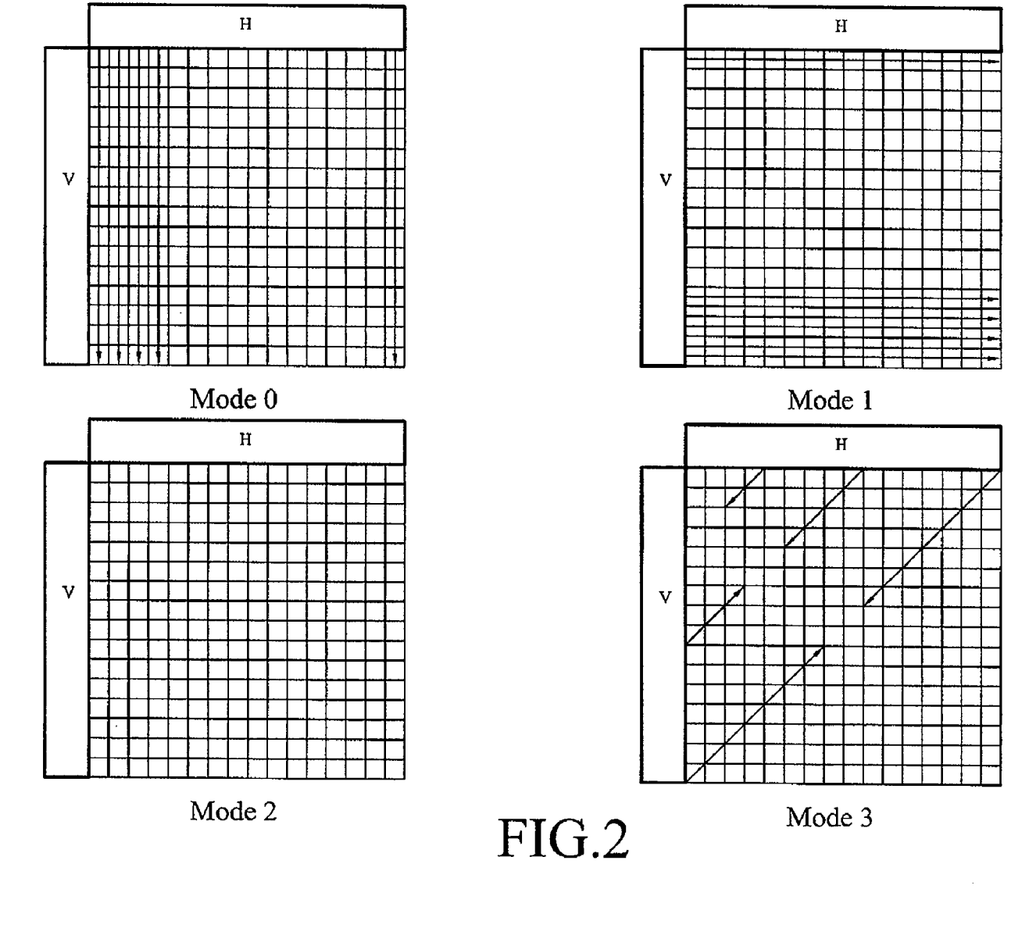
FIG. 2 shows four 16×16 prediction modes.

FIG. 2 is a diagram illustrating four 16×16 prediction modes, wherein H and V represent coded pixels. Similar to the 4×4 block, the mode with minimum error will be adopted. Typically, 16×16 prediction mode is preferable to the flatter region (such as background) to reduce the bit number needed for coding.

After being compressed, the video data are transformed into video bitstreams which are suitable for transmission and store. However, transmission of highly compressed video bitstreams can suffer from packet erasures (especially in regard to wireless video transmission). In order to avoid the degradation in quality of the received video frames caused by video packet erasures, three mechanisms are commonly used to guard against possible packet losses: automatic retransmission request (ARQ), forward error correction (FEC), and error concealment. Comparing with the ARQ and FEC techniques, the error concealment technique does not require additional bandwidth and is especially useful in multicast and broadcast situations. The error concealment technique executed at the video decoder can be classified into two types: spatial error concealment and temporal error concealment. The spatial error concealment utilizes spatial redundancy information in a frame to recover the damaged video sequences, while the temporal error concealment exploits the highly correlation among consecutive frames of the coded sequence to reconstruct the damaged video sequences.

Since the spatial error concealment approach utilizes the spatial redundancy information in a frame without reference to other frames, it is much preferable to the temporal error concealment approach in the presence of scene changes, the appearance and disappearance of objects, irregular motion of objects, especially as errors happen in the initial frame. Other disclosures relating to spatial error concealment approach include "Spatial error concealment of corrupted image data using frequency selective extrapolation" by Meisinger et al., Proc. Int. Conf. Acoust., Speech, Signal Process. (ICASSP), 2004, pp. 209-212; "Error concealment in encoded video streams" by Salama et al., Signal Recovery Techniques for Image and Video Compression and Transmission, 1998, ch. 7; "The error concealment feature in the H.26L test model", by Wang et al., Proc. Int. Conf. Image Processing (ICIP), Rochester, N.Y., USA, September 2002, vol. 2, pp. 729-732; "Maximally smooth image recovery in transform coding" by Wang et al., IEEE Trans. Commun., vol. 41, pp. 1544-1551, October 1993; "Coding and cell loss recovery for DCT-based packet video" by Zhu et al., IEEE Trans. Circuits Syst. Video Technol., vol. 3, pp. 248-258, June 1993; "Transform coded image reconstruction exploiting interblock correlation" by Hemami, IEEE Trans. Image Processing, vol. 4, pp. 1023-1027, July 1995; "DCT coefficients recovery-based error concealment technique and its application to MPEG-2 Bit stream error" by Park et al., IEEE Trans. Circuits and Systems for Video Technology, vol. 7, pp. 845-854, December 1997; "Fast DCT based spatial domain interpolation of blocks in images" by Alkachouh et al., IEEE Trans. Image Process., vol. 9, no. 4, pp. 29-732, April 2000; "Content-adaptive spatial error concealment for video communication" by Rongfu et al., IEEE Trans. Consum. Electron., vol. 50, no. 1, pp. 335-341, January 2004; "Enhanced error concealment with mode selection" by Agrafiotis et al., IEEE Trans. Circuits Syst. Video Technology, vol. 16, no. 8, pp. 960-973, August 2006; and "Optimization of Spatial Error Concealment for H.264 Featuring Low Complexity" by Huang et al., Proc. Int. Conf. MultiMedia Modeling (MMM), January 2008, LNCS 4903, pp. 391-401, the entire contents of which being incorporated herein by reference.

Many researches for improving the spatial error concealment approach have been proposed, but the problem of heavy computation load still exists. Therefore, it is desirable to provide a method capable of both reducing computation complexity of the spatial error concealment and maintaining the display quality.

SUMMARY OF THE INVENTION

In light of the problems associated with the prior art, the present invention provides a high-performance spatial error concealment method which is suitable for H.264/AVC video compression standard. The spatial error concealment method of the present invention exploits the advantages of both of the directional interpolation and bilinear interpolation, and reduces the computational complexity by using the information provided by the directional spatial intra prediction model, which improves the overall efficiency accordingly.

According to one aspect of the present invention, a method for performing spatial error concealment is provided. The method of the present invention includes the following steps: detecting a damaged macroblock with missing pixels; obtaining coding information of a plurality of neighboring macroblocks of the damaged macroblock; determining edge feature of the damaged macroblock based on the coding information; and selecting one of a bilinear interpolation (DI) algorithm and a directional interpolation (BI) algorithm based on the edge feature to reconstruct the missing pixels of the damaged macroblock.

According to another aspect of the present invention, a computer readable medium is provided. The computer readable medium has a program code stored thereon, and when the program code is executed by a video decoding system, the program code causes the video decoding system to implement the above-mentioned method.

Other aspects of the present invention would be stated and easily understood through the following description or the embodiments of the present invention. The aspects of the present invention would be appreciated and implemented by the elements and their combinations pointed out in the appended claims. It should be understood that the above summary of the invention and the following detailed description are only illustrative and are not to limit the present invention.

BRIEF DESCRIPTION OF THE DRAWINGS

The drawings are employed to illustrate the embodiments and the principles of the present invention in conjunction with the description.

However, it should be understood that the present invention is not limited to the shown configurations and elements, in which.

DETAILED DESCRIPTION OF THE PREFERRED EMBODIMENTS

The present invention provides an efficient spatial error concealment method utilizing information of edge directions of blocks neighboring with the damaged block for switching between bilinear interpolation (BI) and directional interpolation (DI) to offer better display quality. Furthermore, the present invention reduces computational complexity of the process of edge direction detection by utilizing directional spatial intra-prediction and spatial redundancy information. The objects, features and advantages of the present invention will become more apparent by referring to the following description of the preferred embodiments and FIGS. 3-8. However, the apparatuses, elements, and steps of the method described in the following embodiments are intended to illustrate the present invention, but not to limit the scope of the invention.

The spatial error concealment technique utilizes the spatially correlated information to recover the damaged blocks by interpolating the undamaged information in the same frame. The spatial error concealment approach of the present invention switches between the BI and DI algorithms to calculate the pixel values of the damaged (or missing) block according to the image content and complexity.

Figure 3:
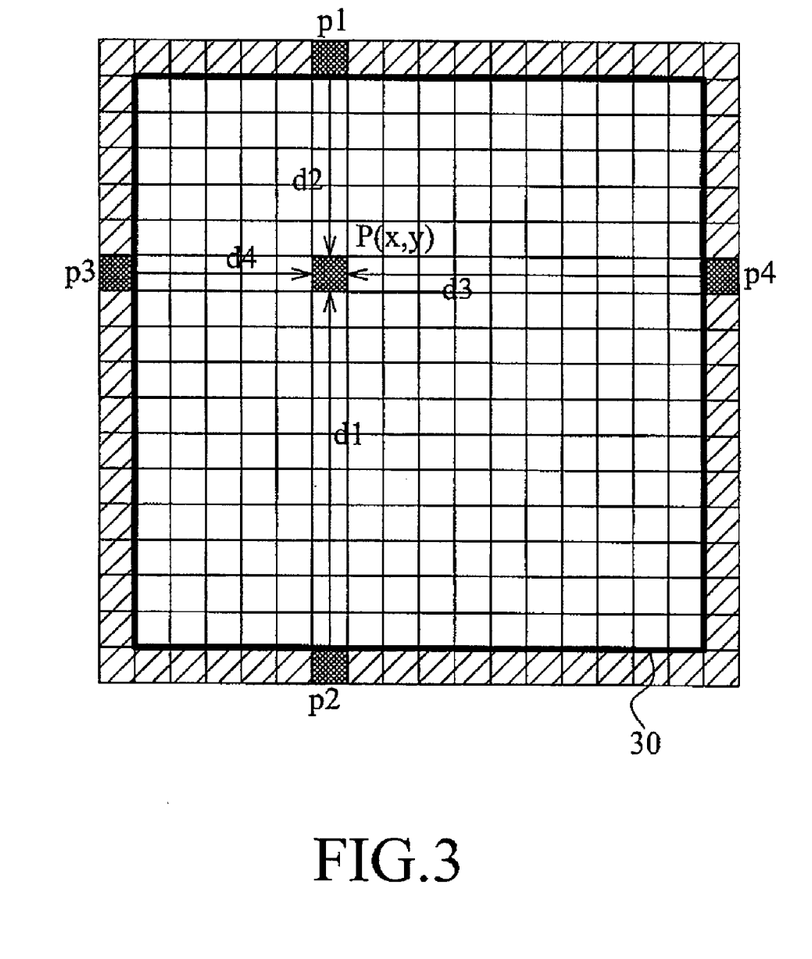
FIG. 3 illustrates the principle of the BI algorithm.

The BI algorithm, one of the default algorithms used in the H.264 compression standard, primarily utilizes the linear interpolation along both of the horizontal and vertical directions to recover the false or missing pixels. FIG. 3 depicts a diagram illustrating the principle of the BI algorithm, wherein the block 30 is a damaged 16×16 macroblock (MB), the oblique-line area represents the pixels on the boundaries of four (upper, lower, left, and right) neighboring macroblocks to be used as the reference pixels for MB 30. The BI algorithm utilizes weighted linear interpolation in both horizontal and vertical directions, where each pixel in the MB 30 is recovered through the weighted average of the pixels on the boundaries of the four neighboring macroblocks. For example, referring to FIG. 3, the value of the missing pixel p(x, y) is interpolated by using the nearest four pixels p1, p2, p3, p4 in both horizontal and vertical directions, wherein the weights of the pixels p1, p2, p3, p4 are respectively in inverse proportional to the corresponding distances with respect to the pixel p(x, y). Specifically, in terms of the BI algorithm, the value of the missing pixel p(x,y) is interpolated by the following formula:

$$p(x, y) = \frac{p1 \times d1 + p2 \times d2 + p3 \times d3 + p4 \times d4}{d1 + d2 + d3 + d4}$$

where d1, d2, d3, d4 are distances corresponding to the reference pixels p2, p1, p4, p3 respectively, i.e. the distances between the missing pixel p(x, y) and each of the pixels p2, p1, p4, and p4.

Figure 4A:
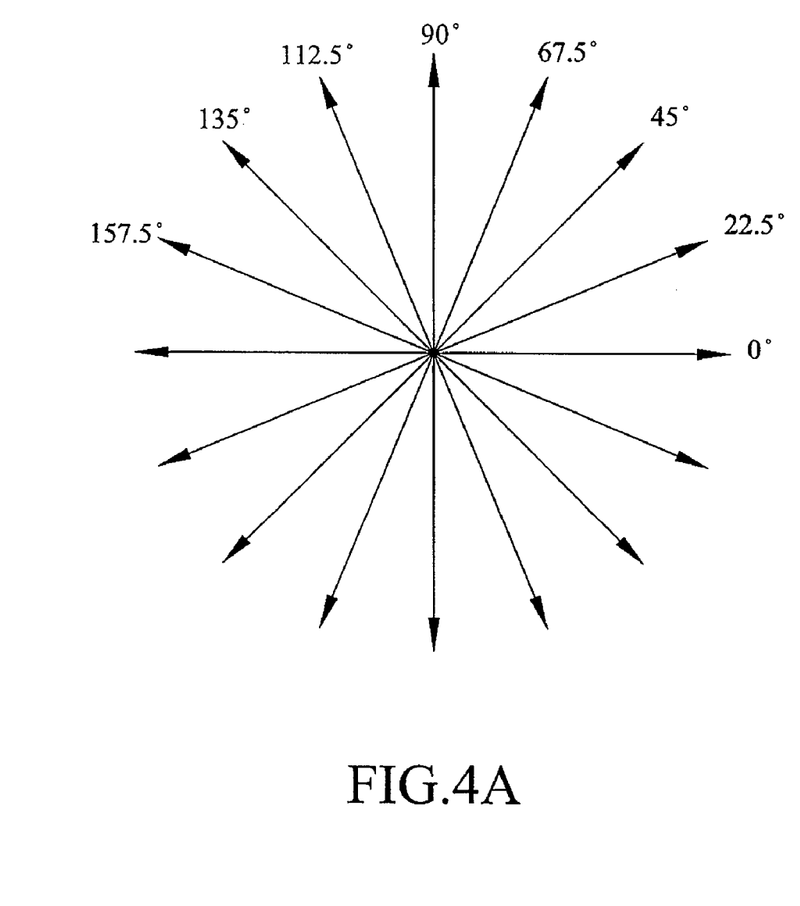
FIGS. 4A and 4B illustrate the principle of the BI algorithm.
Figure 4B:
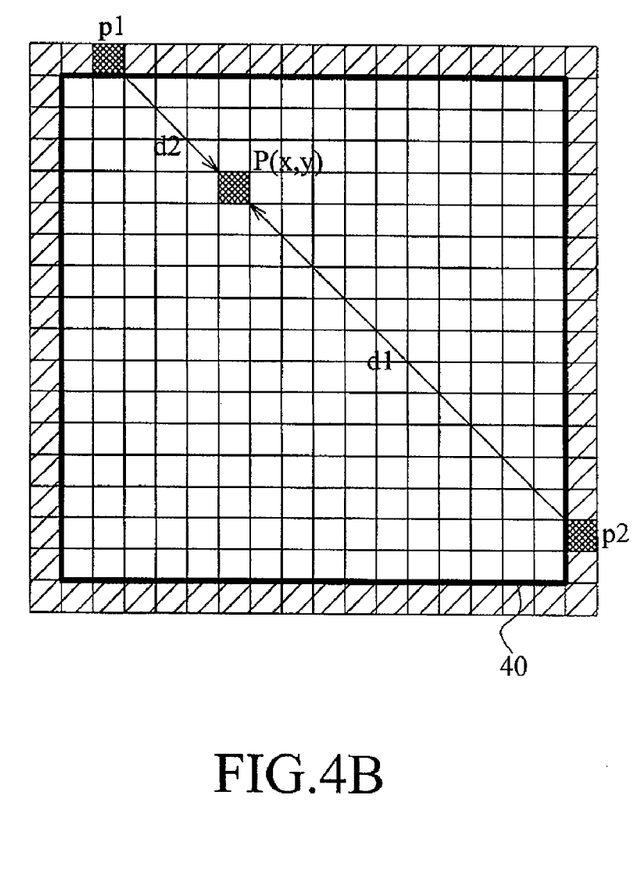

Since BI algorithm may weaken some edge information, it is unsuitable for a damaged macroblock containing a strong edge. By contrast, the DI algorithm gets better performance of error concealment for a macroblock exhibiting strong edge. FIGS. 4A and 4B are diagrams schematically illustrating principle of the DI algorithm that classifies the edge direction values into eights rages from zero to 157.5 degrees using a step of 22.5 degrees. Referring to FIG. 4B, the block 40 indicated by the bold line is a damaged 16×16 MB, and the oblique-line area represents pixels on the boundaries of the adjacent macroblocks in four directions. The DI algorithm reconstructs each pixel of the damaged MB 40 by weighted 1-D interpolation along the strongest direction indicated by the edge strength of the pixels on the boundaries of the neighboring macroblocks. Therefore, the first step of the DI algorithm is to estimate the direction of each existing border pixel contained within the four neighboring macroblocks surrounding the missing MB 40. In one embodiment, the Sobel edge filter is used to perform the convolution operation to calculate the edge gradients of pixels on the boundaries of the neighboring macroblocks, where the Sobel operator is a 3×3 mask defined as follows:

$$S_x = \begin{bmatrix} -1 & 0 & 1 \\ -2 & 0 & 2 \\ -1 & 0 & 1 \end{bmatrix} \quad S_y = \begin{bmatrix} -1 & -2 & -1 \\ 0 & 0 & 0 \\ 1 & 2 & 1 \end{bmatrix}$$

The edge horizontal gradient (Gx) and the vertical gradient (Gy) of the pixel p(x, y) are computed with the Sobel operators as follows:

$$G_x = X_{i+1,j-1} - X_{i-1,j-1} + 2X_{i+1,j} - 2X_{i-1,j} + X_{i+1,j+1} - X_{i-1,j+1}$$

$$G_y = X_{i-1,j+1} - X_{i-1,j-1} + 2X_{i,j+1} - 2X_{i,j-1} + X_{i+1,j+1} - X_{i-1,j-1}$$

The magnitude and the angular direction of the gradient at coordinate pixel p(x, y) can be expressed as:

$$\text{Grand} = \sqrt{G_x^2 G_y^2} \quad \theta \tan^{-1}(Gx/Gy)$$

Next, the obtained edge direction values are classified according to the eight ranges shown in FIG. 4A, and then a winning edge direction is subsequently determined according to the calculated magnitude value of the edge direction. Finally, each missing pixel within the damaged MB 40 is recovered by weighted one-dimensional (1-D) interpolation along the winning edge direction using the pixels on the boundaries of the neighboring macroblocks. For example, in the embodiment shown in FIG. 4B, the winning edge direction, which is determined based on the pixels on the boundaries, is 135 degrees direction so that the pixel value of the pixel p(x, y) is calculated by interpolating weighted values of two nearest reference pixels p1 and p2 in the direction of 135 degrees, wherein each of the reference pixel p1 and p2 is weighted inversely proportional to the distance apart from the pixel p(x, y). Specifically, in terms of the DI algorithm, the value of the missing pixel p(x,y) of DI is interpolated by the following formula:

$$p(x, y) = \frac{p1 \times d1 + p2 \times d2}{d1 + d2}$$

where d1 and d2 are distances corresponding to the reference pixels p2 and p1 respectively.

Figure 5A:
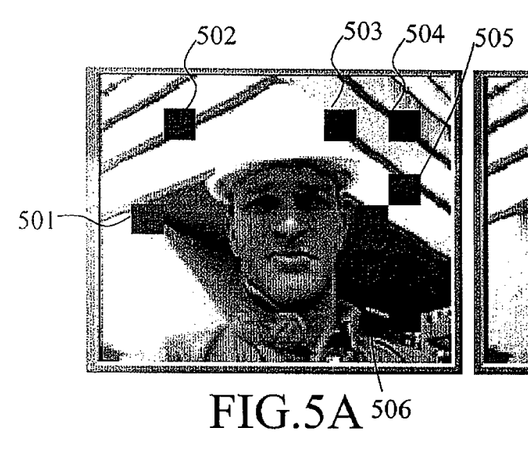
FIGS. 5A-5F illustrate the frames concealed by BI and DI algorithms in accordance with different embodiments of the present invention.
Figure 5B:
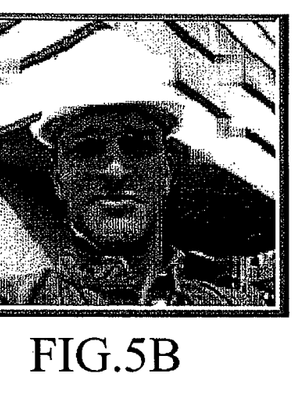
Figure 5C:
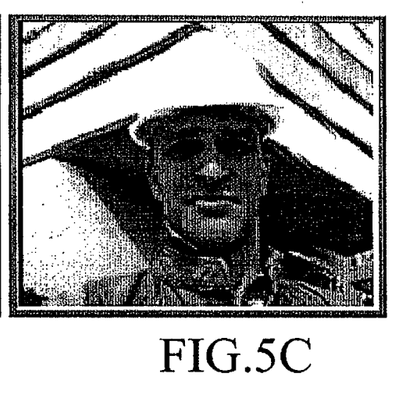
Figures 5D, 5E:
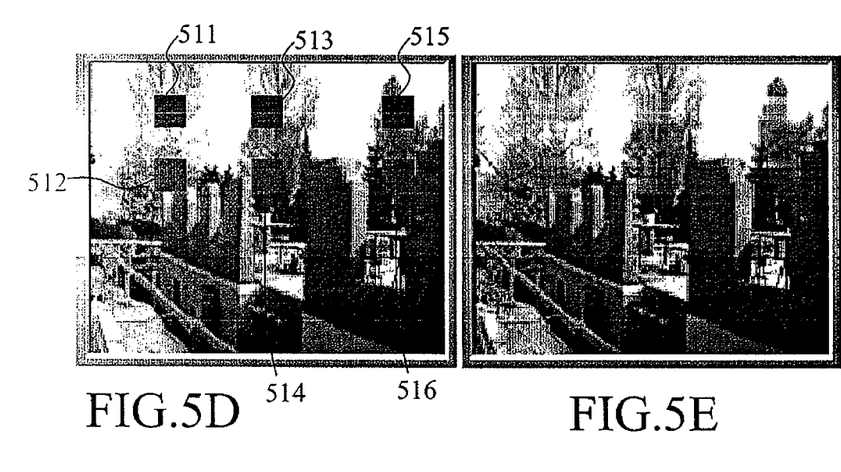
Figure 5F:
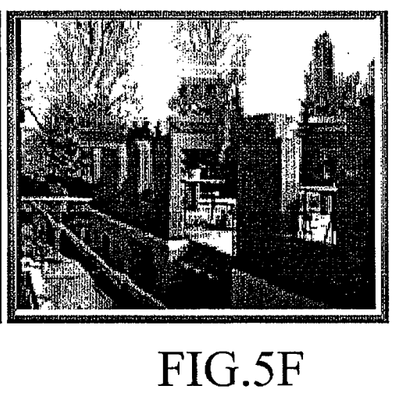

Since edges play an important role in the human visual system, it is important to both protect existing edges from deterioration and avoid the creation of false edges. Typically, the use of BI algorithm can blur original strong edges if there is only one direction edge in the neighborhood. However, DI algorithm along a single direction can cause the creation of false edges if more than one edge exists in the surrounding. For example, referring to FIGS. 5A-5C, FIG. 5A illustrates a damaged frame with missing blocks 501-506, and FIGS. 5B and 5C illustrate the concealment results of the frame in FIG. 5A concealed by BI and DI algorithms respectively. Since there is only one strong edge in each of the missing blocks 501-506 as shown in FIG. 5A, the use of DI algorithm has better performance by preserving the existing strong edge (as illustrated in FIG. 5C), while the BI algorithm, on the contrary, makes the existing edge indistinct (as illustrated in FIG. 5B). FIGS. 5D-5F show another embodiment of the present invention. FIG. 5D illustrates a damaged frame with missing blocks 511-516, while FIGS. 5E and 5F illustrate the concealment results of the frame in FIG. 5D concealed by BI and DI algorithms respectively. As shown in FIG. 5D, since no single strong edge is present in each of the missing blocks 511-516, the BI algorithm can be effective in the avoidance of both the creation of false edges and the emphasis of relatively weak ones (as illustrated in FIG. 5E), while DI algorithm may cause the creation of false edges resulting in poor concealment of errors (as illustrated in FIG. 5F). It can be seen that BI and DI algorithms are suitable for different situations, so that the present invention provides a spatial error concealment method which exploits the advantages of both BI and DI approaches by switching between BI and DI interpolations according to the edge direction of the damaged block which is predicted through the edge features of the neighboring blocks. Furthermore, the present invention correlates the eight directions defined in the spatial intra-prediction coding tool with the eight edge directions of the Sobel filter, and thereby reduces the complexity of edge direction detection. In the present invention, the coding modes of the eight directional 4×4 prediction modes and the three directional 16×16 prediction modes are used to ascertain a strong estimation for edge direction. Generally, when the intra-coded block lacks prominent edges, the coding mode tends to choose either the intra 16×16 DC prediction mode or the intra 4×4 DC prediction mode. In sum, the present invention can reduce the complexity of the process of edge direction detection by utilizing the correlation between the spatial intra-prediction and the edge directions.

Figure 6:
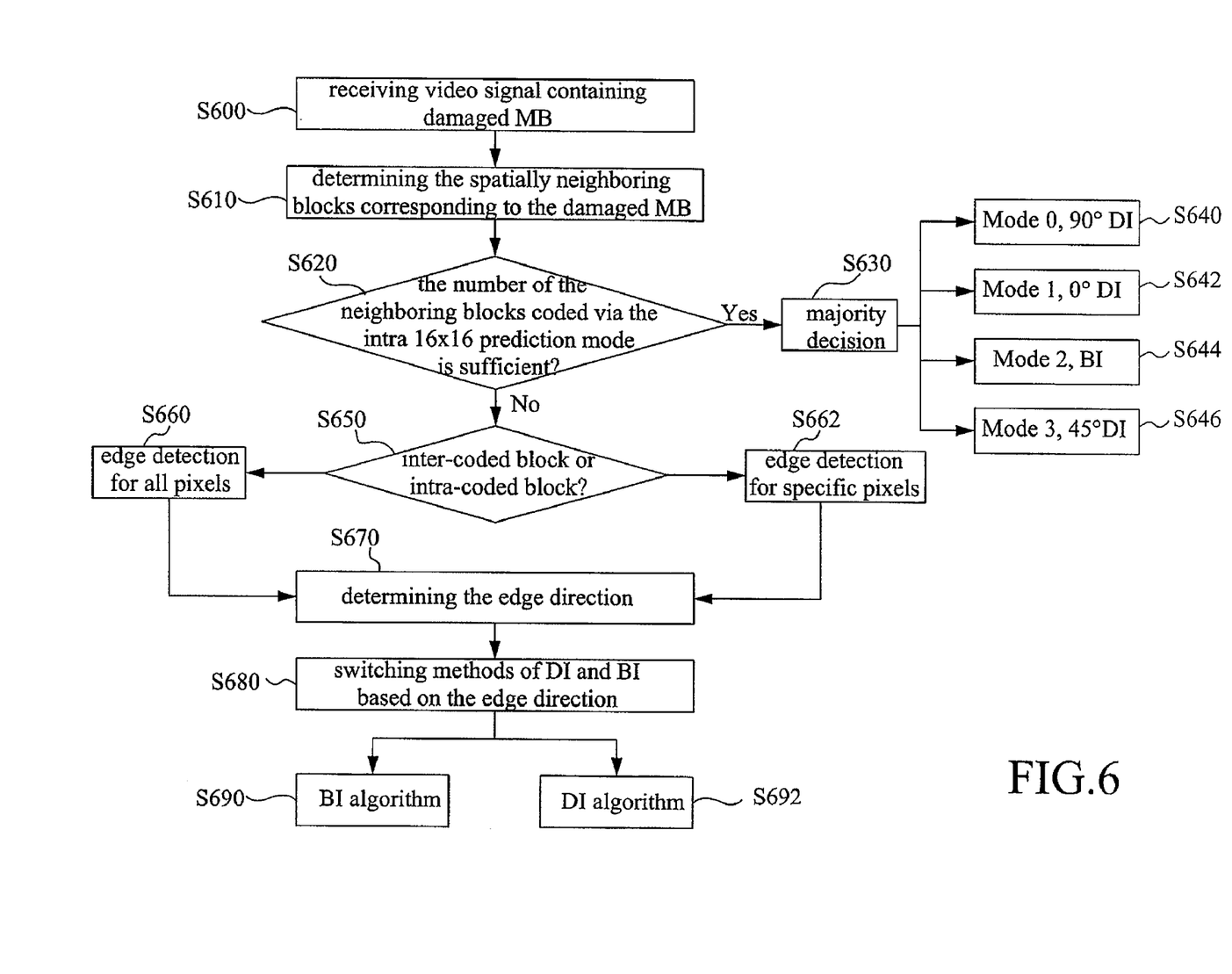
FIG. 6 is a flowchart showing a method for spatial error concealment in accordance with one embodiment of the present invention.
Figure 7:
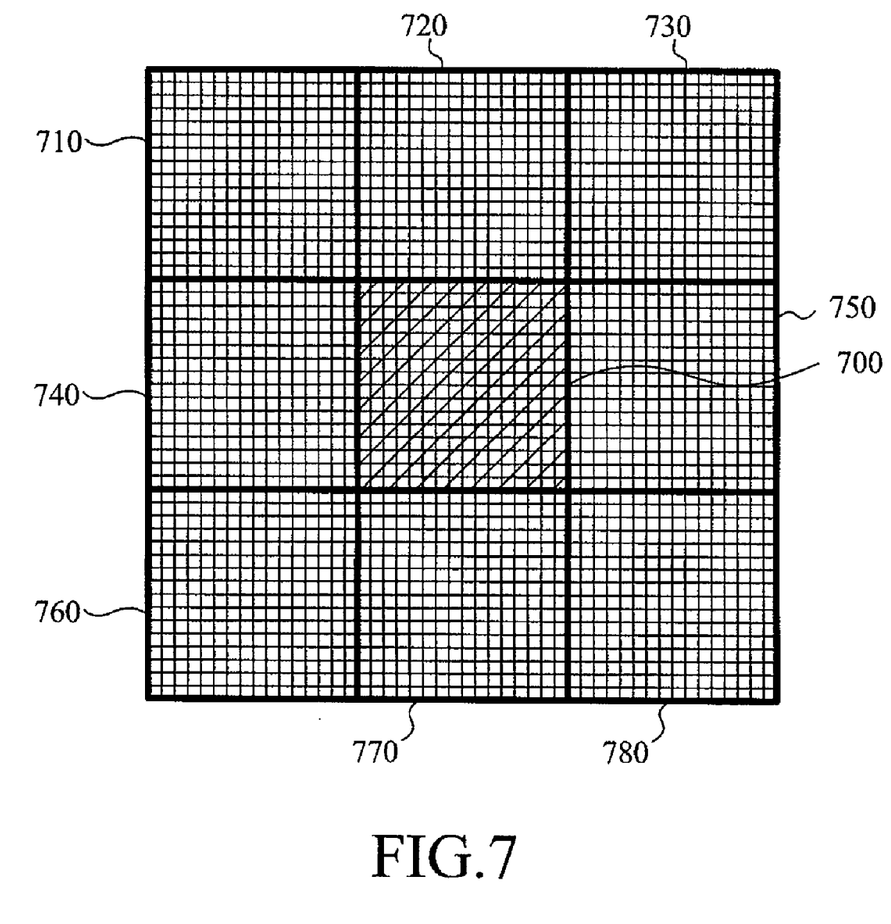
FIG. 7 is a diagram illustrating a method for spatial error concealment in accordance with one embodiment of the present invention.
Figure 8:
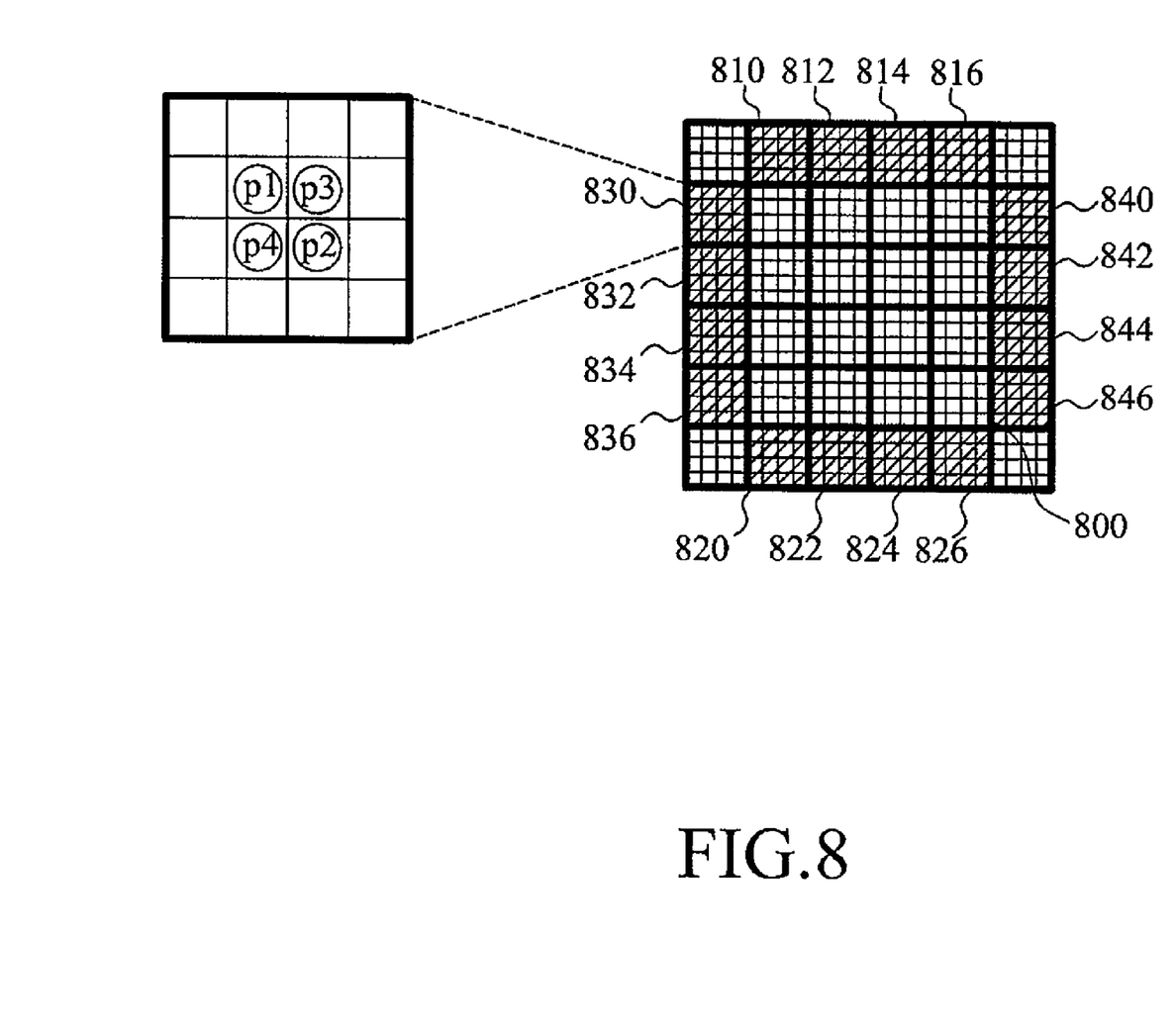
FIG. 8 is a diagram illustrating a method for spatial error concealment in accordance with another embodiment of the present invention.

FIG. 6 is a flowchart showing a method for spatial error concealment in accordance with one embodiment of the present invention. Referring now to FIGS. 6-8, in step S600, a video signal, which is comprised of a plurality of frames, having at least one frame containing missing or damaged macroblocks is received. In step S610, the spatially neighboring blocks corresponding to a missing or damaged macroblock are determined. For example, the MB 700 shown in FIG. 7 is a 16×16 macroblock damaged during transmission, and MB 710, 720, 730, 740, 750, 760, 770, and 780 are the neighboring blocks corresponding to the MB 700. Next, in step S620, it is determined whether the neighboring blocks 710, 720, 730, 740, 750, 760, 770, and 780 are coded via the intra 16×16 prediction mode. Typically, the information provided by intra 16×16 prediction mode tends to be more useful for background or flat regions, whereas intra 4×4 prediction mode tends to be used primarily for foreground or highly textured regions of real images. Therefore, if the step S620 determines that there are enough neighboring macroblocks coded via the intra 16×16 prediction mode (i.e. the number of the neighboring macroblocks coded via an intra 16×16 prediction mode is larger than a predetermined value), it is supposed that the missing macroblock is coded via intra 16×16 prediction mode too (which may correspond to, for example, background region), and the procedure proceeds to step S630. It should be noted that the criterion used in step S620 may vary with applications. For example, in one embodiment, when there are at least five neighboring macroblocks chosen via 16×16 prediction mode for the six neighboring blocks 720, 730, 740, 750, 760, and 770 of the damaged MB 700 (i.e. the top, top-right, left, right, bottom, and bottom-left neighboring blocks), it is determined that the number of the neighboring blocks coded via intra 16×16 prediction mode is enough. In step S630, instead of using the Sobel edge filter in the detection of edge direction, the missing pixels within damaged macroblocks are directly concealed by weighted interpolation along either a single direction (vertical, horizontal or diagonal) or bi-direction (vertical-horizontal), depending on the majority decision of these neighboring macroblocks coded via the intra 16×16 prediction mode. Specifically, if majority of the neighboring macroblocks coded via intra 16×16 prediction mode are coded via prediction mode 0 (vertical direction), the procedure proceeds to step S640 to reconstruct the missing pixels of the damaged macroblock 700 by the directional interpolation algorithm along the direction of 90 degrees. Furthermore, in step S630, with regard to the conditions under which the majority decision of the neighboring macroblocks coded via intra 16×16 prediction mode are determined as prediction mode 1 (horizontal direction), prediction mode 2 (DC), and prediction mode 3 (plane), the procedure proceeds to step S642, S644, or S646 respectively to reconstruct the missing pixels of the damaged macroblock 700 by the DI algorithm along the direction of zero degree, the BI algorithm, or the DI algorithm along the direction of 45 degrees respectively.

In step S620, if there are not enough neighboring macroblocks for intra 16×16 prediction mode, the procedure proceeds to step S650. Now referring to both of FIG. 6 and FIG. 8 which illustrates a 16×16 macroblock 800 damaged during transmission, the pixels on the boundaries of the four (i.e. top, left, right, and bottom) neighboring macroblocks of the damaged MB 800 are disjoined into sixteen 4×4 blocks 810, 812, 814, 816, 820, 822, 824, 826, 830, 832, 834, 836, 840, 842, 844, and 846, and each of these 4×4 blocks is categorized as either an inter-coded 4×4 block or an intra-coded 4×4 block (i.e. coded via the inter prediction or the intra prediction). For each inter-coded 4×4 block in FIG. 8, the process proceeds to step S660 to make use of the 3×3 Sobel edge direction filter in order to calculate gradient and magnitude of the pixels within each inter-coded 4×4 block. On the other hand, in step S650, for each intra-coded 4×4 block in FIG. 8, the process proceeds to step S662 to estimate the edge direction and magnitude of specific pixels by using the coding information provided by intra prediction mode to minimize the complexity of edge direction detection. For example, in step S662, the Sobel filter is used to estimate the edge direction and magnitude of the inner pixels (such as pixels p1, p2, p3, and p4 in FIG. 8) of the intra-coded 4×4 block, and then it is determined whether the estimated edge direction of the inner pixels is the same as the direction of the intra prediction of the intra-coded 4×4 block. Take the 4×4 block 830, which is assumed to be coded by intra prediction mode, as an example. Edge detection begins at pixels p1 and p2. If the estimated edge direction of at least one of p1 and p2 is the same as the direction of the intra prediction mode adopted by the block 830, the direction of the strong edge in the block 830 can be determined to be the direction of the intra prediction mode without the need of estimating the edge direction of other pixels. If neither pixel p1 nor pixel p2 exhibits an existing strong edge in the same direction as the intra prediction mode adopted by the block 830, then two additional pixels, p3 and p4, will be calculated. If none of the estimated results of the inner pixels p1-p4 correspond to the intra prediction mode, the edge detection is continued to calculate the rest of pixels of the block 830, as being performed for a normal inter-coded block. It should be noted that, in steps S660 and S662, except for the Sobel edge filter, other common edge detection means, such as Prewitt filter or Laplacian filter, could also be adopted to calculate the edge direction and magnitude.

Next, in step S670, the strong edge direction of the damaged MB is determined according to both of the edge direction of each pixel of the inter-coded 4×4 blocks determined in step S660 and the edge direction of specific pixels (such as p1, p2, p3, and p4) or all pixels of the intra-coded 4×4 blocks determined in step S662.

Next, in step S680, the edge features of the damaged macroblock, which are determined in step S670 by the edge direction data in the neighborhood of the damaged macroblock, are used to determine when to switch between DI and BI algorithms. For example, the errors are concealed by the DI algorithm if the 4×4 blocks surrounding the missing damaged macroblock have the same edge direction; on the other hand, if the edge directions of the 4×4 blocks surrounding the damaged macroblock are different, i.e. no prominent singular edge exists, the BI algorithm is selected to perform the spatial error concealment. In one embodiment, on the basis of the edge strength value calculated in step S670, one or more strong edges are reserved as candidate edges which are then used in the calculation of the directional entropy (DE) for switching between BI and DI algorithms. Entropy describes the state of disorder in a system in the attainment of directional distribution. A large DE value indicates interaction among edges of different directions, effectively canceling out a specific edge direction, whereas a small DE value indicates the existence of only one dominant edge direction in the area. The directional entropy (DE) can be calculated by:

$$H_d = -\Sigma p(d_x)\log_2 p(d_x)$$

where p(dx) is the directional probability density function associated with the candidate edge direction data (dx). Based on the DE value, the formula for threshold β is given by:

$$\beta = \frac{-\sum p(d_x)\log_2 p(d_x)}{\mathrm{Max}(H_d)}$$

In this embodiment, the threshold is set as β=0.85, which means that the neighboring blocks with a threshold of less than 0.85 have a clear dominant edge direction while the neighboring blocks with interacting edges feature a threshold of more than 0.85. A threshold β equal to 1 corresponds to equal probability of all directions.

Therefore, in step S680, if the threshold β of the neighboring blocks exceeds 0.85 or more than two strong edge directions exist, the procedure proceeds to step S690, the missing block is concealed by weighted vertical-horizontal interpolation (BI). On the other hand, if the threshold β of the neighboring blocks is smaller than 0.85 or only one dominant edge exists, the procedure proceeds to step S692, the missing block is concealed by weighted one directional interpolation (DI).

The spatial error concealment method of the present invention switches directional interpolation and bilinear interpolation based on the directional entropy and the H.264 coding tool of directional spatial domain intra prediction in spatially corresponding neighboring correctly-received blocks. According to tandem utilization of the directional spatial intra prediction coding tool, the huge numbers of edge direction filter calculations are avoided and in so doing the overall computational complexity is reduced enormously. Consequently, the spatial error concealment method of the present invention is effective and fully utilizes the H.264 video streaming characteristic.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

We claim:

1. A method for performing spatial error concealment, comprising:
- (a) detecting a damaged macroblock with missing pixels;
- (b) obtaining coding information of a plurality of neighboring macroblocks of the damaged macroblock, wherein the plurality of neighboring macroblocks are a plurality of 4×4 blocks surrounding the damaged macroblock;
- (c) determining edge feature of the damaged macroblock based on the coding information, and the step (c) further comprising the following steps:
  - (c1) calculating edge directions of all pixels within an inter-coded 4×4 block, wherein the inter-coded 4×4 block is one of the plurality of the 4×4 blocks and is coded via an inter prediction mode;
  - (c2) calculating edge directions of specific pixels within an intra-coded 4×4 block, wherein the intra-coded 4×4 block is one of the plurality of the 4×4 blocks and is coded via an intra prediction mode;
  - (c3) if the edge directions calculated in step (c2) are the same to a direction of the intra prediction mode, determining the edge feature of the damaged macroblock based on the edge directions calculated in both of the step (c1) and step (c2); and
  - (c4) if the edge directions calculated in step (c2) are not the same to a direction of the intra prediction mode, calculating edge directions of remaining pixels within the intra-coded 4×4 block, and determining the edge feature of the damaged macroblock based on the edge directions of all pixels within the intra-coded 4×4 block and the edge directions calculated in the step (c1);
- (d) selecting one of a bilinear interpolation algorithm and a directional interpolation algorithm based on the edge feature to reconstruct the missing pixels of the damaged macroblock.

2. The method according to claim 1, wherein the edge direction detection is performed by using a Sobel filter.

3. The method according to claim 1, wherein the steps (c3) and (c4) further comprise calculating a directional entropy for the result of the edge direction detection, and determining the edge feature of the damaged macroblock based on the directional entropy.

* * * * *